United States Patent [19]

Christopher

[11] Patent Number: 4,656,515

[45] Date of Patent: Apr. 7, 1987

[54] HORIZONTAL COMPRESSION OF PIXELS IN A REDUCED-SIZE VIDEO IMAGE UTILIZING COOPERATING SUBSAMPLING AND DISPLAY RATES

[75] Inventor: Todd J. Christopher, Indianapolis, Ind.

[73] Assignee: RCA Corporation, Princeton, N.J.

[21] Appl. No.: 715,818

[22] Filed: Mar. 25, 1985

[51] Int. Cl.$^4$ ............................................ H04N 5/272
[52] U.S. Cl. ...................................... 358/183; 358/22
[58] Field of Search ................................. 358/22, 183

[56] References Cited

U.S. PATENT DOCUMENTS

| | | | |
|---|---|---|---|
| 4,134,128 | 1/1979 | Hurst | 358/22 |
| 4,139,860 | 2/1979 | Micic et al. | 358/22 |
| 4,249,213 | 2/1981 | Inside et al. | 358/183 |
| 4,267,560 | 5/1981 | Iswikawa et al. | 358/22 |
| 4,278,993 | 7/1981 | Suzuki | 358/22 |
| 4,298,891 | 11/1981 | Baba et al. | 358/183 |
| 4,399,462 | 8/1983 | Balopole et al. | 358/183 |
| 4,533,942 | 8/1985 | Gall et al. | 358/78 |

FOREIGN PATENT DOCUMENTS 2937133 4/1980 Fed. Rep. of Germany .

OTHER PUBLICATIONS

Funk-Technik 40, 1985, No. 10, Heidelberg Helmut Mitschke "Ein Fernsehgerat fur mehrere Videosignale", pp. 409–410.

L. R. Rabiner et al., IEEE Transactions on Audio and Electronics, "Terminology in Digital Signal Processing", vol. AU-20, No. 5, Dec. 1972, pp. 325–326.

J. A. Cadzow, "Discrete-Time Systems", Prentice Hall, 1973, Chapter 9, pp. 299–302.

*Primary Examiner*—Michael A. Masinick
*Assistant Examiner*—Robert M. Bauer
*Attorney, Agent, or Firm*—E. M. Whitacre; P. J. Rasmussen; K. N. Nigon

[57] ABSTRACT

A pix-in-pix television display includes circuitry for reducing the amount of memory needed to hold one field of the reduced size image. In the display apparatus, digital samples representing the large and small picture signals are developed at substantially equal rates by separate circuitry. Subsampling circuitry stores one out of every five of the samples representing a horizontal line of the small picture. These samples are displayed, synchronous with the large picture at a rate three-fifths times the display rate of the large picture samples to produce an apparent size reduction of one-third in the horizontal direction.

9 Claims, 10 Drawing Figures

HORIZONTAL COMPRESSION OF PIXELS IN A REDUCED-SIZE VIDEO IMAGE UTILIZING COOPERATING SUBSAMPLING AND DISPLAY RATES

The present invention relates to a video signal processing system which subsamples a video signal at a first rate and displays the samples at a second rate to achieve an apparent size reduction that is less than the subsampling ratio.

In a pix-in-pix display, a reduced size and, therefore, reduced resolution image produced from an auxiliary signal is inset on a part of the image produced by a main signal. A television receiver having a pix-in-pix display is described, for example, in U.S. Pat. No. 4,298,891 entitled "Television Receiver" and hereby incorporated by reference.

A typical pix-in-pix television receiver uses separate tuners, IF amplifiers and video signal demodulators to obtain two sets of luminance and color-difference signals, one set for the main image and one set for the auxiliary image. Typically, the auxiliary signal is processed through anti-aliasing filters and subsampled both horizontally and vertically to produce a signal representing the reduced-size image.

Anti-aliasing filters are used to reduce the bandwidth of the signal in both the horizontal and vertical directions to reduce the distortion components caused by subsampling. These distortion components are also called aliasing components. They occur when a signal is sampled at a rate that is less than the rate established by the well known Nyquist sampling criterion. The aliasing components are frequencies in the original signal which are outside of the frequency spectrum of the subsampled signal and which are translated by the subsampling process into different frequencies that are within the frequency spectrum of the subsampled signal. This translation is commonly referred to as a folding of the frequency spectrum of the signal about a frequency equal to one-half of the subsampling frequency. Although anti-aliasing filters are desirable in a subsampling system, they may have the undesirable side-effect of blurring transitions in the reproduced image.

A typical pix-in-pix television receiver contains considerably more circuitry than a standard single image receiver and consequently costs more to produce. A significant part of this extra circuitry is memory, such as charge coupled devices or random access memory (RAM) which stores one or more fields of the subsampled image. The memory is used to appropriately synchronize the auxiliary signals with the main signals to reproduce a stable auxiliary image.

Auxiliary samples are written into the memory synchronously with the auxiliary signal and read from the memory, for display, synchronously with the main signal. Since the main and auxiliary signals may be unrelated, the system may need to write samples into memory and read samples from memory at the same time. Memory arrangements which are designed to avoid these read-write conflicts tend to be expensive.

Another factor in the cost of the memory is the relatively large number of pixel storage cells needed to hold the auxiliary image. For example, an NTSC digital television receiver which has a sampling frequency of four times the color subcarrier frequency, produces 910 samples per horizontal line. One field of video signal contains 262.5 lines. If the image is subsampled in a one-to-three ratio, both horizontally and vertically, and if only 70 percent of the lines and only 75 percent of the samples on each line are processed, 13,935 pixels are generated for each field. Since each pixel may include eight bits of luminance information and six bits of chrominance information, such a pix-in-pix system requires 195,090 bits of memory to store one field of the reduced-size auxiliary signal.

It is an object of this invention to provide apparatus for subsampling and displaying a reduced-size video image which produces an image size reduction that is less than the subsampling ratio.

SUMMARY OF THE INVENTION

The present invention is embodied in a pix-in-pix television signal display device which displays an auxiliary image as an inset in a main image. The system includes apparatus for subsampling the pixels on each line of the auxiliary signal at a rate of 1/N times the auxiliary signal pixel rate. The system further includes apparatus for displaying these pixels at a rate of M/N times the pixel display rate of the main signal to achieve an apparent size reduction of 1/M in each horizontal line. N and M are positive real numbers, and N is greater than M.

DETAILED DESCRIPTION

Figure 1:
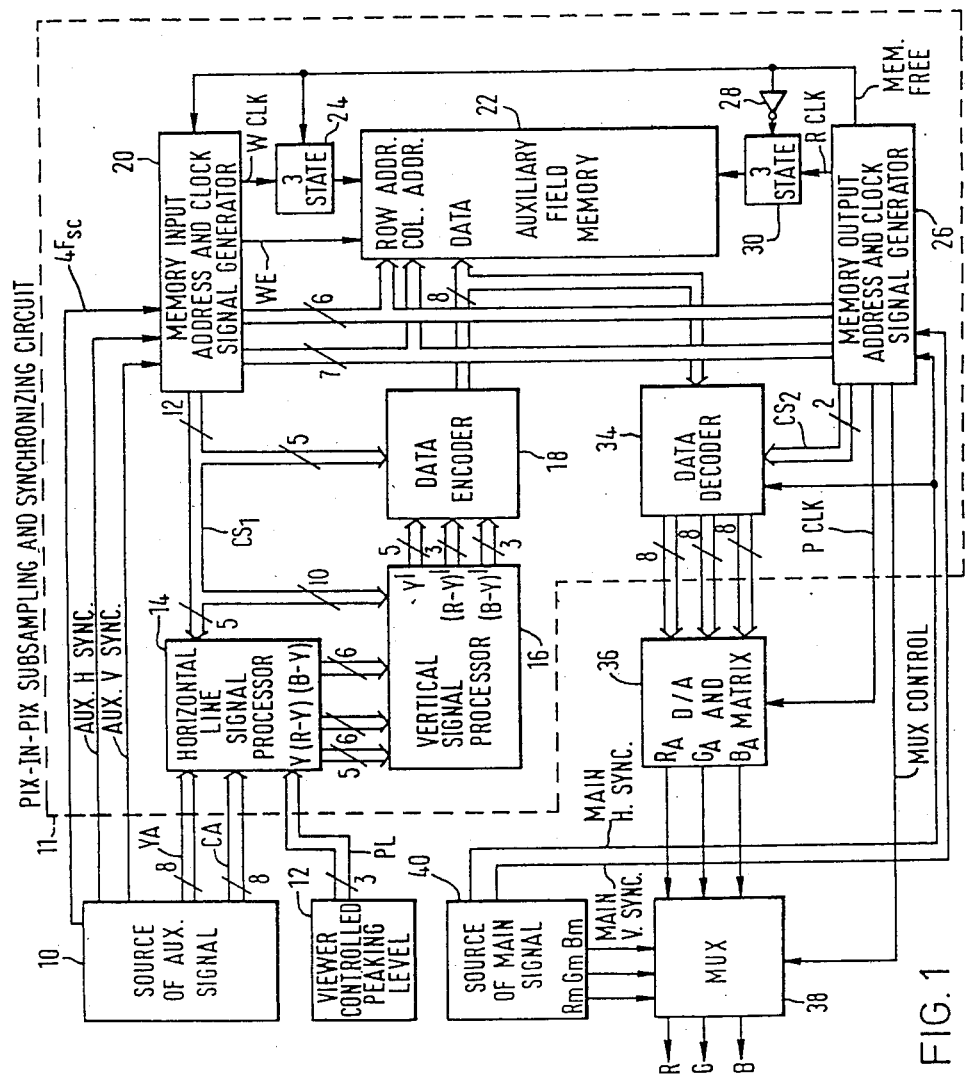
FIG. 1 is a generalized block diagram of a pix-in-pix television receiver which includes an embodiment of the present invention.

In the drawing, broad arrows represent busses for multiple-bit parallel digital signals. Line arrows represent connections carrying analog signals or single bit digital signals. Depending on the processing speed of the devices, compensating delays may be required in certain of the signal paths. One skilled in the art of digital circuit design would know where such delays would be needed in a particular system.

FIG. 1 shows in block form the main elements of a pix-in-pix processing circuit. Video signal representing the primary or main image is derived from the source 40. Source 40 may include a receiving antenna to capture broadcast video signals, and all of the processing circuitry of a conventional television receiver required to develop red, R, green, G, and blue, B, color signals to drive a display device (not shown). The main signal source 40 provides main RGB signals to a first set of signal input terminals of multiplexer 38. In addition, the main signal source 40 develops horizontal, MAIN HSYNC and vertical MAIN VSYNC, synchronizing signals which are applied to the pix-in-pix subsampling and synchronizing circuitry 11.

A source of auxiliary signals 10 which includes, for example, the tuner, IF amplifier, video detector, sync separating circuitry, and luminance/chrominance signal separating circuitry of a conventional digital television receiver provides eight-bit auxiliary luminance and chrominance signals $Y_A$ and $C_A$ respectively. The circuitry of source 10 also generates auxiliary horizontal and vertical sync pulses, AUX VSYNC and AUX HSYNC respectively and a clock signal, $4F_{sc}$. The clock signal is locked in phase to the color synchronizing burst component of the auxiliary signal and has a frequency, $4f_{sc}$, of four times the color subcarrier frequency, $f_{sc}$.

The auxiliary luminance and chrominance signals $Y_A$ and $C_A$ are applied to the pix-in-pix subsampling and synchronizing circuitry 11. Subsampling and synchronizing circuitry 11 reduces the information content of both the luminance, $Y_A$, and chrominance, $C_A$, components since the auxiliary signal will be reproduced as a reduced size image. Subsampling and synchronizing circuitry 11 also conditions the auxiliary signal components for substitution into predetermined portions of a predetermined number of sequential lines of the main signal.

Auxiliary luminance and chrominance samples from circuitry 11 are applied to the digital-to-analog converter (DAC) and matrix circuit 36. The DAC and matrix circuit 36 converts the auxiliary digital luminance and chrominance signals to respective analog signals and combines them in appropriate proportions to produce red, R, green, G, and blue, B, color signals for driving a display device (not shown). These RGB color signals are coupled to a second set of input terminals of multiplexer 38.

Multiplexer 38 responsive to a signal, MUX CONTROL, from circuitry 11, selectively, alternatively applies the main color signals from source 40 and the auxiliary color signals from DAC and matrix circuitry 36 to the display device to produce a pix-in-pix display.

Signals $Y_A$ and $C_A$ from source 10 are applied to horizontal line signal processor 14 of subsampling and synchronizing circuitry 11. A source of viewer controlled peaking level 12, which is, for example, a four position switch, provides a digital peaking signal, PL, to horizontal line processor 14. The peaking signal, PL, may have values of 0, ¼, ½ or 1. Memory input address and clock signal generator 20 (described below) provides the processor 14 with the clock signals $4F_{sc}$, $2F_{sc}$, $4F_{sc}/5$ and $F_{sc}/5$ via bus $CS_1$. The clock signals $4F_{sc}$, $2F_{sc}$, $4F_{sc}/5$ and $F_{sc}/5$ have respective frequencies of four times, two times, four-fifths times and one-fifth times the color subcarrier frequency.

Figure 2A:
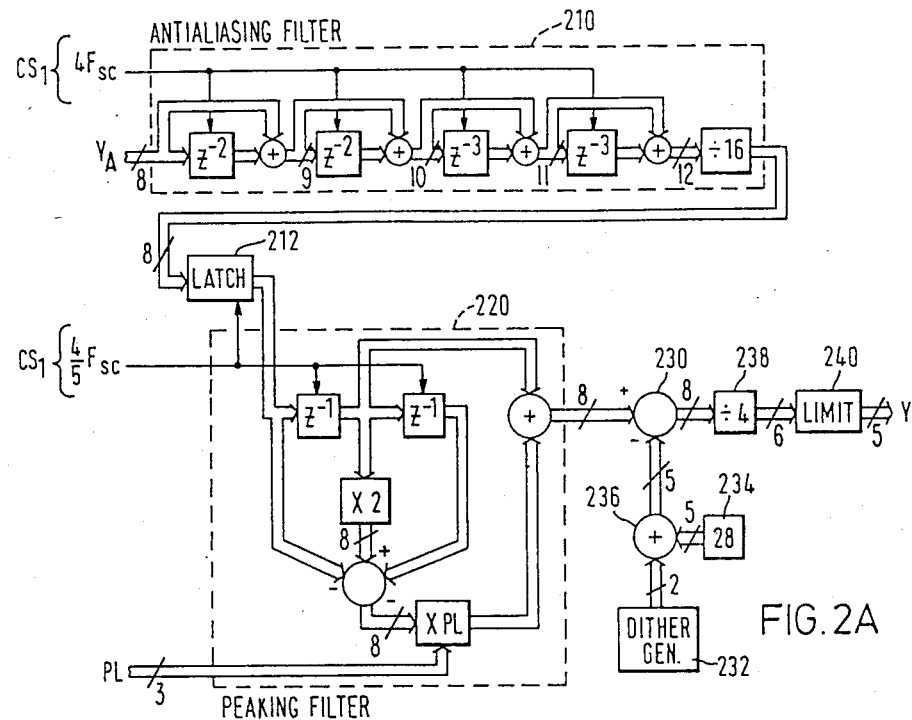
FIGS. 2A and 2B, respectively are block diagrams of luminance and chrominance horizontal line signal processors suitable for use in the receiver shown in FIG. 1.
Figure 2B:
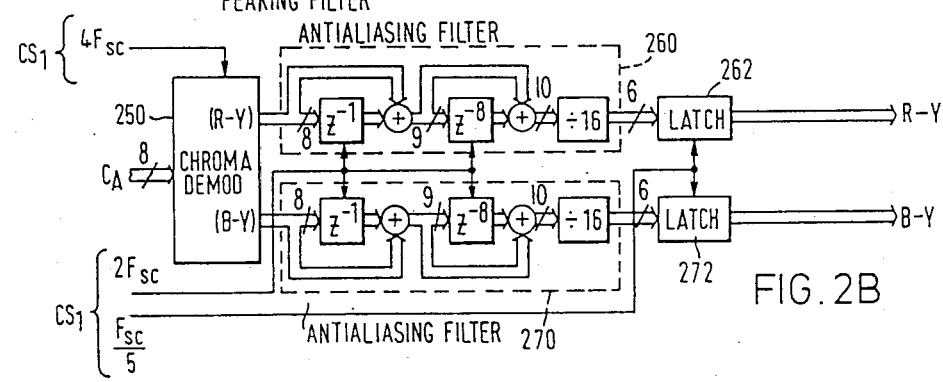

FIGS. 2A and 2B are block diagrams showing respectively the luminance and chrominance sections of the horizontal line processor 14. In FIG. 2A, the auxiliary luminance signal $Y_A$ and the clock signal $4F_{sc}$ are applied to a FIR low-pass filter 210. Low-pass filter 210 is of conventional design and has a transfer function H(Yh) which is defined by the equation $$H(Yh)=(1+Z^{-2})^2*(1+Z^{-3})^2 16.$$

Where Z connotes the conventional Z-transform notation, and $Z^{-i}$ represents a delay period equal to i periods of the $4F_{sc}$ clock signal. Filter 210 is an anti-aliasing filter. It attenuates high frequency components of the auxiliary luminance signal, $Y_A$, relative to the low frequency components to reduce aliasing distortion when the auxiliary luminance signal is subsampled.

The output samples of filter 210 are applied to latch 212 which is clocked by the $4F_{sc}/5$ clock signal provided by address and clock signal generator 20. Consequently, latch 212 subsamples the filtered luminance signal, to produce luminance samples at a rate of $4f_{sc}/5$ corresponding to a reduction factor of 1/5 from the $4f_{sc}$ sample rate of samples applied to its input. For NTSC samples occurring at approximately 14.32 MHz the frequency response of the low-pass filter 210 has a 3 dB point at about 750 KHz and cuts off at approximately 2.3 MHz. According to the Nyquist sampling criterion, the maximum signal frequency for subsampling an NTSC signal at a $4f_{sc}/5$ rate is 1.43 MHz. Thus, low-pass filter 210 only partially eliminates aliasing components, however, the aliasing components that are folded back into the desired signal spectrum are significantly reduced.

The $4F_{sc}/5$ clock signal is active only during approximately 80 percent of the active portion of each horizontal line to prevent blanking information from being processed. For each line of auxiliary signal video samples, only 128 luminance samples are provided.

The subsampled auxiliary luminance signal from latch 212 is applied to the peaking filter 220. The $4F_{sc}/5$ clock signal and the viewer controlled peaking level, PL, are also applied to the peaking filter 220. One skilled in the art of digital filter design will recognize from the drawing that the transfer function, $T_P$, of this filter can be expessed as $$T_P=Z^{-1}+PL(-1+2Z^{-1}-Z^{-2})$$

in Z-transform notation.

The peaking filter amplifies the high frequency components of the filtered and subsampled luminance signals relative to the low frequency components. This filter has the effect of sharpening vertical edges in the reproduced image. The peaking filter amplifies the portion of the subsampled auxiliary signal into which the aliasing components are folded. Amplifying the frequency spectrum containing the aliasing components may seem counter-productive. However, it has been found from subjective testing that the image produced by the system including the particular low-pass filter 210 and the peaking filter 220 is more pleasing than the image produced without the peaking filter. Moreover, by adjusting the peaking level, PL, among its four possible values, a viewer can increase or reduce the amount by which the high frequency components are peaked to produce an image which is the most subjectively pleasing to him. Note that with a zero valued peaking level, PL, distortion due to the aliasing components is minimized, however, the brightness or contrast of high spatial resolution image components is low. Increasing the peaking level increases the brightness of the high spatial resolution image components to develop a more uniform image with slightly increased distortion. From subjective tests it has been determined that it is more desirable to increase the brightness of these components and suffer the added distortion than vice versa.

The samples provided by peaking filter 220 are eight-bits wide. It is desirable, for economic reasons, to reduce the bit-width of the luminance samples from eight bits to five bits before writing them into memory. In the present embodiment, this reduction is done in three steps.

The first step subtracts a value substantially equal to the black-level bias from each of the samples provided by filter 220. The black-level bias may be thought of as a constant value which represents the color black in the reproduced image. This value is greater than zero to allow control information, such as the horizontal and vertical sync pulses to be multiplexed with the signals that represent image information at levels below that of the black level. The black level bias does not need to be stored in the memory with the image information, since this control information is not relevant to the stored image.

The second and third steps of the bit-width reduction process divide each sample by a factor of four and limit the maximum value of any sample to a value of 31 respectively.

In the actual hardware which performs this bit-width reduction, eight-bit auxiliary luminance samples are applied to the minuend input port of subtracter 230 the subtrahend input port of which is coupled to receive a dithered value representing the black-level bias from adder 236. Digital value source 234 applies a value of 28 to one input port of adder 236 and a dither generator 232 applies a pseudo-random two bit dither signal to the second input port of adder 236. Dither generator 232 is, for example, a conventional two-bit shift register having its output terminal coupled to its input terminal through an inverter.

The samples provided by subtractor 230 are applied to a divider 238. Divider 238 truncates the samples from eight-bits to six-bits by removing the two least significant bits. The quantization levels lost due to sample truncation are partially retained by the dithering of the black-level bias value. The concept of quantization level restoration through the use of a dither signal is known in the art and, so, is not described herein.

The six-bit samples from divider 238 are reduced to five-bit samples by a limiter circuit 240. Limiter 240 changes any digital value greater than 31 to be 31 and passes the values less than or equal to 31 unchanged. Limiter 240 may be built from conventional components by one skilled in the art. It is not described because its construction is not considered a part of the present invention.

In FIG. 2B, eight-bit chrominance samples and the $4F_{sc}$ clock signal from source 10 are applied to a chrominance demultiplexer 250. As is known in the art, when NTSC chrominance signals are appropriately sampled by a clock signal locked in phase to the color synchronizing burst reference component and having a frequency of $4f_{sc}$, the chrominance samples may be represented by the sequence (R-Y), (B-Y), −(R-Y), −(B-Y), (R-Y) . . . etc. where the signs indicate sampling phase, not sample polarity. Chrominance demodulator 250, for example, separates this sequence into a sequence of (R-Y) samples and a sequence of (B-Y) samples and reverses the polarity of alternate samples in each of the two sequences. The two sequences of samples provided by demodulator 250 represent baseband (R-Y) and (B-Y) color difference signals respectively. Chrominance demodulator 250 is of conventional design.

The (R-Y) and (B-Y) samples provided by demodulator 250 are processed by two identical anti-aliasing filters, 260 and 270 and subsampled from a $2f_{sc}$ rate to a rate of $f_{sc}/5$ by identical latches 262 and 272.

Demodulator 250 applies eight-bit (R-Y) samples to the input port of FIR Low-pass filter 260. The $2F_{sc}$ clock signal from address and clock signal generator 20 is applied to the clock input terminal of filter 260. The transfer function $T_{260}$ of this filter is expressed by $$T_{260}=(1+Z^{-1})(1+Z^{-8})/16$$

in Z-transform notation. The filter 260 attenuates the high frequency components of the right-bit (R-Y) samples relative to the low frequency components and provides six-bit samples at its output port. Thus, the filter 260 both filters the (R-Y) samples and truncates their two least significant bits. The digital (R-Y) signal from filter 260 is applied to latch 262 which subsamples the signal at a rate of $f_{sc}/5$. The clock signal $F_{sc}/5$ is applied to the clock input terminal of latch 262. Latch 262 responsive to the $F_{sc}/5$ clock signal selects every tenth sample provided from the low-pass filter 260 and outputs these samples as the subsampled signal (R-Y). To prevent the horizontal blanking information from being processed, this clock signal is active only during approximately 80 percent of the active portion of each horizontal line. Consequently, for each line of video samples, only 32 (R-Y) samples are provided.

The anti-aliasing filter 270 and latch 272 are identical to filter 260 and latch 262 and, produce the subsampled signal (B-Y).

Figure 3A:
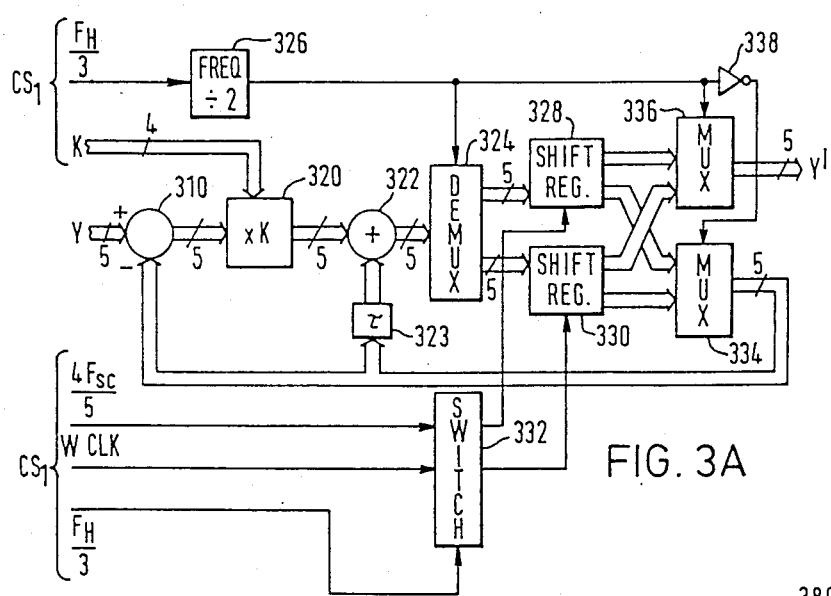
FIGS. 3A and 3B, respectively are block diagrams of luminance and chrominance vertical signal processors suitable for use in the receiver shown in FIG. 1.
Figure 3B:
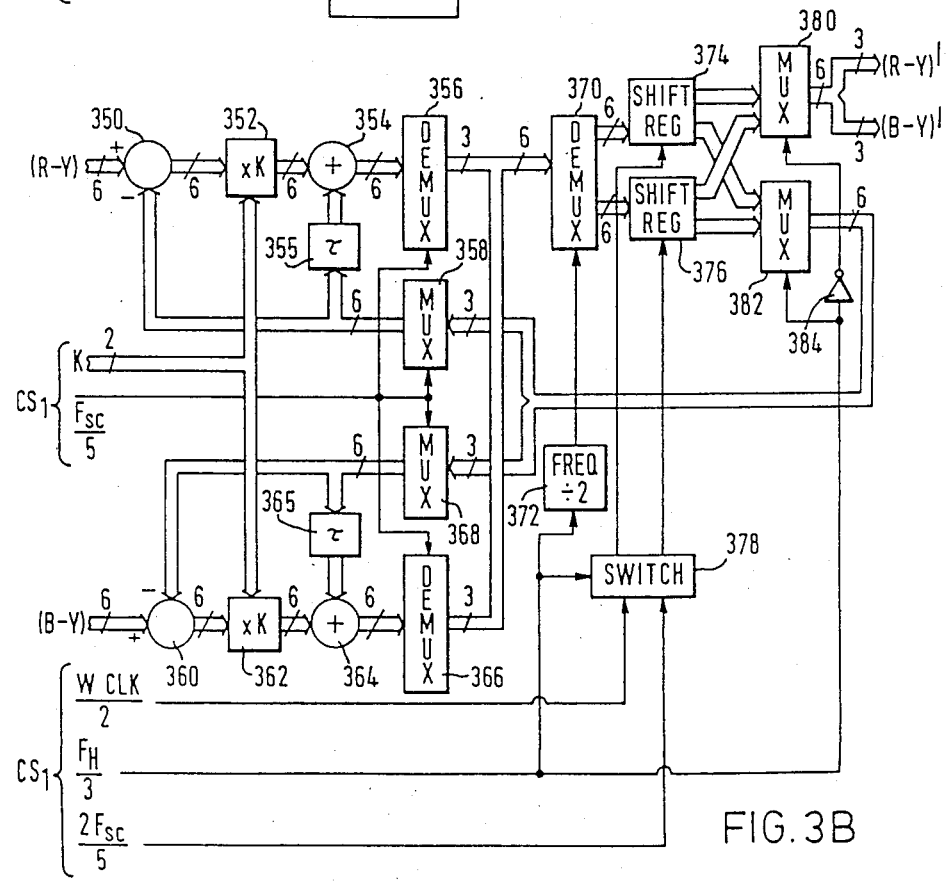

Referring again to FIG. 1, the Y, (R-Y) and (B-Y) auxiliary signals from horizontal line processor 14 and the clock and control signals from address and clock signal generator 20 coupled via bus CS₁ are applied to the vertical signal processor 16. FIGS. 3A and 3B are block diagrams of the luminance and chrominance signal processing portions of processor 16 respectively. Vertical signal processor 16 is an infinite impulse response (IIR) low-pass filter which reduces aliasing distortion in the vertical direction when the vertical lines are subsampled in a 1 to 3 ratio.

Functionally, filter 16 has three sections, one for the auxiliary luminance signal and one for each of the two auxiliary color difference signals. Each of these sections averages signal from three horizontal image lines of the subsampled video signal by the following method. The first line is stored in a shift register unmodified. As each sample of the second line is applied to the filter, the corresponding sample from the first line is subtracted from it and the difference between the sample values is scaled by one-half. The corresponding sample from the first line is then added to this scaled difference value and the composite sample is stored in the shift register. When the samples of the third line are applied to the filter, the corresponding composite samples are subtracted from the samples of the third line and the difference between these sample values is scaled by ⅔. The corresponding composite sample is then added to this scaled difference value to form an averaged sample and the averaged sample is stored in the shift register. This method of averaging uses shift registers having the same bit-width as the samples it averages and yet has less truncation error than a simple averaging filter which accumulates the sum of three lines of samples, each scaled by one-third. Moreover, the scale factors used by this method; 1, ½ and ⅔; may be applied to the samples by a simple shift and add technique. This method does not form the exact average of three lines of samples but the approximation it produces has been found to be subjectively pleasing.

Each of the three filter sections employs two shift registers which alternate between functions. While one of two shift registers develops the average samples the other shift register is used to output the samples to auxiliary image field memory 22 as explained below.

FIG. 3A is a block diagram of the luminance signal processing stage of vertical signal processor 16. Five-bit luminance samples from horizontal signal processor 14 are applied to the minuend input port of the subtracter 310. Five-bit samples from the shift register 328 or shift register 330 whichever is currently conditioned to operate in the signal averaging mode are coupled via multiplexer 334 to the subtrahend input port of subtracter 310. Subtracter 310 develops the differences between the incoming samples and the samples provided by the shift register and applies these difference samples to sample scaler 320 which multiplies each difference sample by the appropriate scale factor K. The scale factors K are developed by address and clock signal generator 20. The samples provided from the shift register 328 (330) are zero valued samples during the first line interval of the three line averaging process and correspond to vertically aligned pixels from the preceding line and preceding two lines during the second and third line intervals of the averaging process respectively. As stated above, the scale factor has values of 1, ½ or ⅔ depending on whether samples are respectively from the first, second or third line of the three line group being applied to vertical signal processor 16. The samples provided by sample scaler 320 are applied to one input port of adder 322. Samples from shift register 328 (330) are coupled via multiplexer 334 and delay element 323, to a second input port of adder 322. Delay element 323 compensates for the processing time through subtracter 310 and sample scaler 320. Adder 322 combines the scaled and delayed samples and applies the sum of these samples to demultiplexer 324. Demultiplexer 324 is controlled by a signal having a frequency ($f_H/6$) of one-sixth the horizontal line scanning frequency $f_H$ and a 50 percent duty cycle.

For the three horizontal line periods when the $F_H/6$ control signal is in a logic high state, demultiplexer 324 applies five-bit luminance samples to shift register 328. During the next three horizontal line periods, the control signal is in a logic low state and the demultiplexer 324 applies the luminance samples to shift register 330. The $F_H/6$ control signal is generated by applying the $F_H/3$ pulse signal developed by address and clock signal generator 20 to frequency divider 326.

Shift registers 328 and 330 are identical. Each contains 128 five-bit storage locations. The clock signals for the shift registers 328 and 330 are provided by switch 332. The $4F_{sc}/5$ clock signal and the memory write clock signal, WCLK, are applied to the input terminals of switch 332. The $F_H/3$ signal controls switch 332 to connect the $4F_{sc}/5$ clock signal to the shift register which is receiving data from the demultiplexer and to connect the WCLK signal to the other shift register.

The output ports of both shift registers 328 and 330 are connected to the two input ports of each of the two multiplexers 334 and 336. The signal $F_H/6$ developed by frequency divider 326 is applied to the control input terminal of multiplexer 336 and to inverter 338. The output signal of inverter 338 is applied to the control input terminal of multiplexer 334. Multiplexer 334 is controlled to connect the shift register which is receiving data from demultiplexer 324 to subtracter 310 and to delay element 323. Concurrently, multiplexer 336 is controlled to connect the other shift register to the data encoder circuit 18, described below.

FIG. 3B is a block diagram of the vertical signal processors for the (R-Y) and (B-Y) color difference signals. The (R-Y) and (B-Y) processors are similar to the luminance signal processor. Corresponding stored (R-Y) samples from the previous lines are subtracted from the incoming (R-Y) samples in subtracter 350 and corresponding stored (B-Y) samples from previous lines are subtracted from the incoming (B-Y) samples in subtracter 360. Sample scaler 352 multiplies the (R-Y) difference values, and sample scaler 362 multiplies the (B-Y) difference values by the scale factors K. The scale factors K are the same scale factors that are applied to scaling circuit 320 in FIG. 3A. The scaled difference values of the (R-Y) and (B-Y) samples are added to the corresponding stored samples by adders 354 and 364 respectively.

At this point, the color difference signal processors diverge from the luminance signal processor. To reduce the cost of the system, only one pair of shift registers, 374 and 376, is used to store both the R-Y and B-Y color difference signals. To keep the bit width of these shift registers low, the six-bit (R-Y) and (B-Y) samples from adders 354 and 364, respectively are separated by demultiplexers 356 and 366, into sequence of three-bit samples at double the rate of the six-bit sample sequences. Corresponding samples in each of the three-bit sequences from the demultiplexers 356 and 366 are concatenated to form a six-bit sequence which is applied to demultiplexer 370.

The samples provided by the shift registers 374 and 376 via the multiplexers 380 and 384 are not samples of single color difference signals but multiplexed samples in which the three most significant bits (MSB's) are one-half of an (R-Y) sample and the three least significant bits (LSB's) are one-half of a (B-Y) sample.

The three MSB's of the six-bit samples from multiplexer 382 are applied to multiplexer 358 which, under control of the $F_{sc}/5$ clock signal, combines successive pairs of the three-bit MSB samples to regenerate six-bit (R-Y) samples which are applied to subtracter 350 and to adder 354 via compensating delay element 355. Similarly, the three LSB's of the six-bit samples from multiplexer 382 are applied to multiplexer 368, which, under control of the signal $F_{sc}/5$ regenerates six-bit (B-Y) samples from successive pairs of the three LSB's for application to subtracter 360 and, via delay element 365 to adder 364.

The demultiplexer 370, shift registers 374 and 376 and the multiplexers 380 and 382 perform the same functions as the corresponding demultiplexer 324, shift registers 328 and 330 and multiplexers 336 and 334 of FIG. 3A except that the shift registers 374 and 376 each contains only 64 six-bit storage cells and are alternately clocked by the clock signals $2F_{sc}/5$ and WCLK/2. The support circuitry including the frequency divider 372, switch 378 and inverter 384 perform the same functions as the frequency divider 326, switch 332 and inverter 338 described in reference to FIG. 3A.

The six-bit samples provided by multiplexer 380 are split into their three-bit (R-Y) and (B-Y) components and applied to data encoder 18 of FIG. 1.

Data encoder 18 combines the five-bit luminance samples with the three-bit color difference signal samples to produce eight-bit samples which are applied to the auxiliary image field memory 22. Data encoder 18 also incorporates additional control information with the signal data for each horizontal line of the image.

The additional control information is incorporated with the auxiliary signal stored in memory for the following reason. It is envisioned that the system circumscribed in block 11 will be realized using integrated circuitry. This circuitry will be partitioned into three circuits one of which will be a commercially available memory device. The second circuit will likely include the horizontal and vertical processors 14 and 16, the data encoder 18 and the memory input address and clock signal generator 20. The third circuit will include the data decoder 34, the memory output address and clock signal generator 26, and some additional circuitry which is not shown in FIG. 1 and not part of the present invention. With the inclusion of this latter additional circuitry, it is anticipated that there will be insufficient input/output connections available on the integrated circuit to apply the requisite control information of the third integrated circuit. Thus, the control information is to be supplied to the third integrated circuit via the memory device. In addition, the control information will be encoded similarly to the signal information in order to avoid the requirement that the memory be specially addressed to extract the control information for use by the third circuit.

Figure 4:
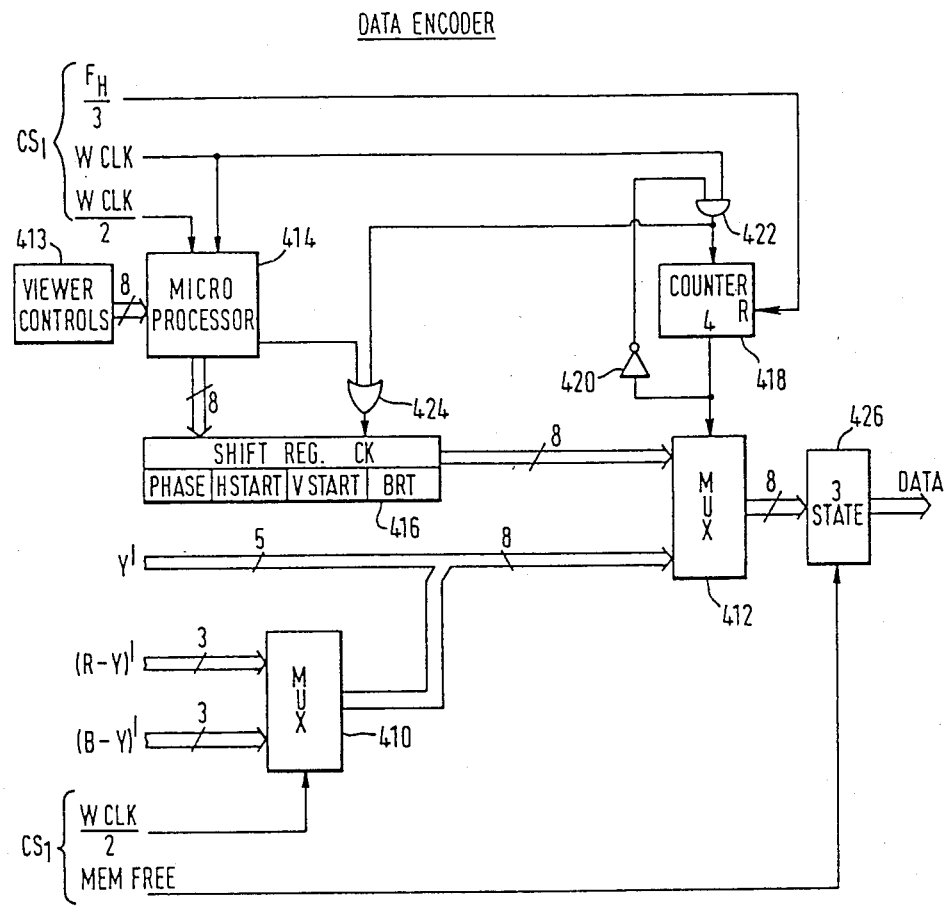
FIG. 4 is a block diagram of a data encoder which may be used in the receiver shown in FIG. 1.

FIG. 4 is a block diagram of data encoder 18. The three bit (R-Y) and (B-Y) samples from vertical signal processor 16 are applied to the two data input terminals of multiplexer 410, the control input terminal of which is coupled to the WCLK/2 clock signal. In this configuration multiplexer 410 alternately provides samples of the (R-Y) and (B-Y) color difference signals, one for each pulse of the WCLK signal. The three-bit color difference samples from multiplexer 410 are concatenated to the five-bit luminance samples provided by vertical signal processor 16 to form eight-bit composite samples which are applied to one input port of multiplexer 412. Every four successive samples that are applied to the multiplexer 412 contain the information from four five-bit luminance samples, one six-bit (R-Y) sample and one six-bit (B-Y) sample. The samples applied to the multiplexer are formatted in four sample sequences such as $Y_1\&(R-Y)_{1MSB's}$, $Y_2\&(B-Y)_{1MSB's}$, $Y_3\&(R-Y)_{1LSB's}$, $Y_4\&(B-Y)_{1LSB's}$, where "&" indicates concatenation of the five-bit luminance sample Y with the three-bit color difference sample.

A microprocessor 414 is coupled, for example, to receive information relating to viewer preferences for the brightness levels and the location of the inset image from viewer controls 413 and information relating to the phase of the first chrominance sample to be stored from the WCLK and WCLK/2 signals. Microprocessor 414 generates the control information for the memory output processors described above from this data. The values of H START, V START and BRT are generated from the values obtained from the viewer control 413, and a value of 0 or 2 is stored in the PHASE register depending on whether WCLK/2 is low or high when the first pulse of the WCLK signal is received for each line of samples. Four samples of control information are written into the four stage shift register 416 synchronous with a clock signal developed by microprocessor 414. This clock signal is applied to the shift register 416 via OR gate 424. A second clock signal applied to OR gate 424 controls the transfer of the data from shift register 416 to the second data input port of multiplexer 412. This clock signal is developed by AND gate 422, counter 418 and inverter 420.

The signal $F_H/3$ provided by address and clock signal generator 20 via bus $CS_1$ is coupled to the reset input terminal of counter 418. The output terminal of counter 418 is connected to the control input terminal of multiplexer 412 and to inverter 420. The output terminal of inverter 420 is connected to one input terminal of AND gate 422. The write clock signal WCLK, from the address and clock signal generator 20 is coupled to the second input terminal of AND gate 422. The output of gate 422 is connected to the input terminal of counter 418 and to one input terminal of OR gate 424.

When the signal $F_H/3$ resets counter 418, a new line of data is available from vertical signal processor 16 to be written into the field memory 22. Since counter 418 is reset, a logic low signal is applied to the control input terminal of multiplexer 412, causing the multiplexer to pass data from shift register 416 to the three-state buffer 426. The logic low signal from counter 418 is complemented, by inverter 420, to a logic high signal which enables AND gate 422 to pass the clock signal pulses WCLK to counter 418 and to OR gate 424. The first four pulses of the WCLK signal transfer the four control information samples from the shift register 416 to the data input of multiplexer 412. This control information includes three eight-bit values representing inset image brightness, inset image vertical and horizontal starting positions and a fourth value indicating the phase of the first color difference signal sample in the current line (either R-Y or B-Y). The fifth pulse of the WCLK signal causes the output of the counter 418 to change to a logic high state. This signal disables AND gate 422 and causes multiplexer 412 to pass image samples from processor 16 to the three-state buffer 426. Three-state buffer 426 is controlled by the MEM FREE signal which is developed by memory output address and clock signal generator 26 and is provided to data encoder 18 via bus $CS_1$ from address and clock signal generator 20. MEM FREE is in a logic high state when data may be written into the memory. When MEM FREE is in a logic high state, buffer 426 provides the data applied to its input port to the data bus of memory 22. However, when MEM FREE is in a logic low state the output port of buffer 426 presents a high impendance to the data bus.

Figure 5:
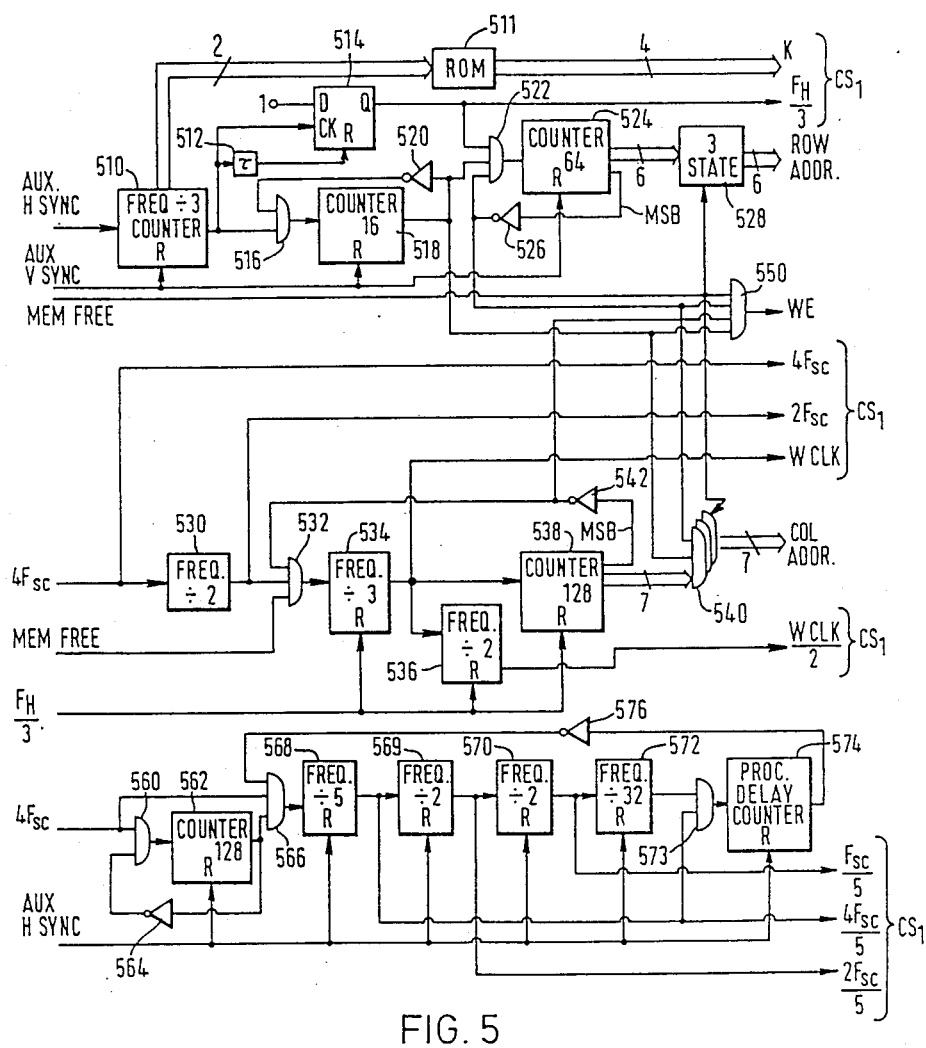
FIG. 5 is a block diagram of a memory input address and clock signal generator suitable for use in the receiver shown in FIG. 1.

FIG. 5 is a block diagram of the memory input address and clock signal generator 20. The auxiliary horizontal and vertical synchronizing signals AUX HSYNC and AUX VSYNC from auxiliary signal source 10 are applied to the respective input and reset terminals of counter 510. The AUX VSYNC signal resets the counter 510 at the start of each field of the auxiliary signal. For each field, counter 510 counts the auxiliary horizontal sync pulses in groups of three. Counter 510 provides a two-bit output signal equal to the line number, modulo 3, of the current line of the auxiliary field. In the current embodiment, this two-bit signal is applied to the read only memory (ROM) 511 which converts the three line numbers into the three values of the signal $K(1, \frac{1}{3}$ and $\frac{2}{3})$ which are applied to the vertical signal processor 16 as set forth above. The counter 510 also produces an output pulse signal having a frequency of $f_H/3$, one-third the frequency of the AUX HSYNC signal. This output pulse signal is applied to delay element 512 and to the clock signal input terminal of the D-type flip-flop 514. The D input terminal of flip-flop 514 is connected to a logic high signal. The output terminal of delay element 512 is connected to the reset input terminal of flip-flop 514. In this configuration, flip-flop 514 produces a narrow pulse, having a pulse width substantially equal to the delay through delay element 512. This pulse occurs coincident with the leading edge of the output pulse signal of counter 512. The signal provided by flip-flop 514 is the $F_H/3$ signal referenced above.

The output pulse signal from counter 510 is also applied to one input terminal of AND gate 516. An inverter 520 provides the signal applied to the second input terminal of AND gate 516. The output terminal of AND gate 516 is connected to the input terminal of the counter 518, the output terminal of which is connected to the input terminal of inverter 520. Counter 518 is reset at the start of each field by the AUX VSYNC signal applied to its reset terminal.

When the counter is reset, its output signal is in a logic low state, causing the output signal of inverter 520 to be logic high. This signal enables AND gate 516 to pass the output pulse signals provided by counter 510 to the input of counter 518. When sixteen of these pulses have been applied to counter 518, its output signal changes to a logic high state, disabling the AND gate 516 from passing signals to the input terminal of counter 518. Consequently, the output signal of counter 518 remains logic high until the counter is reset by the next AUX VSYNC pulse.

The output signal of counter 518 is applied to one input terminal of AND gate 522. The $F_H/3$ signal from flip-flop 514 is applied to a second input terminal, and the output signal of inverter 526 is applied to the third input terminal of AND gate 522. AND gate 522 provides the input signal to the counter 524. Counter 524 provides a seven-bit output signal. The MSB of this signal is applied to the input terminal of inverter 526.

Counter 524 is reset at the start of each auxiliary field by the AUX VSYNC signal applied to its reset terminal. When the counter 524 is reset, the MSB of its output signal is low, causing inverter 526 to apply a logic high signal to AND gate 522. When, after 16 pulses of the $F_H/3$ signal, and the output signal of counter 518 changes to a logic high state, the AND gate 522 applies the $F_H/3$ signal to the counter 524. Counter 524 counts 64 pulses of the $F_H/3$ signal before the MSB of its output signal changes to a logic high, disabling AND gate 522 from passing the $F_H/3$ signal. The six LSB's of the signal provided by counter 524 are row addresses for the field memory 22. These addresses are applied to the three state buffer 528 which is controlled by the MEM FREE signal. Buffer 528 provides the addresses to the memory address bus when MEM FREE is in a logic high state and provides a high impedance to the address bus when MEM FREE is low. Each of these row addresses corresponds to one averaged horizontal line of the auxiliary image i.e. three horizontal lines of the signal provided by source 10.

As set forth above, the auxiliary image is reduced by approximately 20 percent in the vertical direction to remove vertical blanking information and then subsampled so that each line of the displayed image corresponds to three lines of the original signal. The $F_H/3$ signal provided by flip-flop 514 is applied to the vertical signal processor 16 which subsamples the auxiliary signal in the vertical direction. The row addresses generated by counter 524 and applied to the field memory 22 by the three state buffer 528 limit the number of lines stored for each field to 64, or approximately 80 percent of the 80 active lines provided by vertical signal processor 16 for each field of the auxiliary signal. The counter 518 eliminates the first sixteen lines provided by processor 16 to center the auxiliary image in the vertical direction. The number sixteen is chosen to simplify implementation. It is contemplated, however, that other values may be used.

The rows of the field memory correspond to the lines of the auxiliary image and the columns correspond to the pixels in each line. The apparatus described below generates the column addresses and the memory write clock signals WCLK and WCLK/2 for processing the pixels and writing them into the memory 22. The $4F_{sc}$ clock signals from source 10, which are synchronized to the color reference burst component of the auxiliary signal, are applied to the frequency divider 530 which produces a clock signal, $2F_{sc}$, having a frequency one-half of that of the $4F_{sc}$ clock signal. Both the $4F_{sc}$ signal and the $2F_{sc}$ signal are applied to the horizontal signal processor 14 via the control signal bus $CS_1$. The $2F_{sc}$ signal is also applied to one input terminal of AND gate 532. The other two input signals to AND gate 532 are MEM FREE and the signal provided by inverter 542. The output terminal of AND gate 532 is connected to the input terminal of the frequency divider 534. Frequency divider 534 produces an output signal having a frequency that is one-third of the frequency of its input signal. The output terminal of frequency divider 534 is connected to the input terminals of both counter 538 and frequency divider 536. Counter 538 counts the clock pulses applied to its input terminal and provides this count as an eight-bit output signal. The MSB of this output signal is connected to the input terminal of inverter 542.

The frequency dividers 534 and 536 and the counter 538 are reset by the $F_H/3$ signal. When counter 538 is reset, the MSB of its output signal is a logic low causing inverter 542 to apply a logic high signal to AND gate 532. When the MEM FREE signal is also high, indicating that data may be written into the memory, AND gate 532 passes the $2F_{sc}$ clock signal from divider 530 to frequency divider 534. Frequency divider 534 generates a clock signal, WCLK, having a frequency of $2f_{sc}/3$. This signal is the write clock signal for the field memory 22. Counter 538 counts the pulses of the WCLK signal to produce the seven-bit column address signal for the field memory 22. Each bit of this address signal is applied to a separate AND gate 540. The other input signals to each of the AND gates 540 are the output signal of counter 518 and the output signal of inverter 526. Each of the AND gates 540 have three-state outputs. The gates 540 are controlled by the signal MEM FREE to provide the column address from counter 538 to the address bus of auxiliary field memory 22 when MEM FREE is in a logic high state and to provide a high impedance to the data bus when MEM FREE is low.

Frequency divider 536, which is reset by the $F_H/3$ signal halves the frequency of the WCLK signal to provide the WCLK/2 signal that is applied to vertical signal processor 16 and data encoder 18 via bus $CS_1$.

AND gate 550 generates the write enable signal, WE, for the auxiliary field memory 22. The signals applied to AND gate 550 are the output signal of counter 518, the output signals of the inverters 526 and 542 and the signal MEM FREE. The signals provided by counter 518 and inverter 526 are both high only when the central 64 lines of the vertically subsampled image are being applied to the memory. The output of inverter 542 is high only while the 128 values from encoder 18 are being applied to the memory. The MEM FREE signal disables the AND gate 550, causing the WE signal to be low, when data is not to be written into the auxiliary field memory 22.

The MEM FREE signal is generated by the memory output address and clock signal generator 26, described below. Briefly, this signal is in a logic low state when data is being read from the memory 22 and in a logic high state otherwise. As set forth above, when MEM FREE is low, it causes the three state buffer 528 and the AND gates 540 to provide a high impedance to the address bus of memory 22. It also causes the three state buffer 426 to provide a high impedance to the data bus of the memory 22. In addition, when MEM FREE is in a logic low state, AND gate 532 is disabled so tht the WCLK and WCLK/2 signals are not generated and the column address does not advance. Thus, when MEM FREE is low the data transfer from the vertical signal processor 16 to the data encoder 18 and from the data encoder 18 to the auxiliary field memory 22 is interrupted. When MEM FREE changes to a logic high state, the operation resumes with no loss of data. The synchronization of the apparatus for writing data to and reading data from the memory 22 is discussed in relation to FIG. 8 below.

The final portion of the memory input address and clock signal generator 20 provides the $4F_{sc}/5$, $2F_{sc}/5$ and $F_{sc}/5$ clock signals which are used by the horizontal signal processor 14 and vertical signal processor 16. The $4F_{sc}$ clock signal from source 10 is applied to one input terminal of AND gate 560 the other input terminal of which is connected to the output terminal of inverter 564. The output terminal of AND gate 560 is connected to the input terminal of the counter 562, the output terminal of which is connected to the input terminal of the inverter 564. Counter 562 is reset at the start of each horizontal line of the auxiliary signal by the signal AUX HSYNC. When the counter is reset, its output signal is low, the output signal of inverter 564 is high and the AND gate 560 applies the $4F_{sc}$ clock signal to the input terminal of counter 562. The counter 562 provides a logic high output signal when it has counted 128 clock pulses. The logic high state at the output terminal of counter 562 is inverted by inverter 564 to disable AND gate 560 from applying the $4F_{sc}$ clock signal to the counter 562. Accordingly, the output signal of counter 562 remains high until the counter is reset by the next auxiliary horizontal sync pulse.

The output terminal of counter 562 is connected to one input terminal of AND gate 566. A second input terminal of AND gate 566 is connected to the output terminal of inverter 576 and the third input terminal is connected to the $4F_{sc}$ clock signal. When AND gate 566 is enabled, the $4F_{sc}$ clock signal is coupled to the series connected frequency dividers 568, 569, 570 and 572. All of these frequency dividers and the counter 574 are reset by the AUX HSYNC signal at the start of each horizontal line of the auxiliary signal. When counter 574 is reset it applies a logic low signal to the inverter 576 which applies a logic high signal to the AND gate 566. When the counter 562 provides a logic high output signal, AND gate 566 applies the $4F_{sc}$ clock signal to the frequency divider 568. Frequency divider 568 divides the $4F_{sc}$ clock signal by five to produce the signal $4F_{sc}/5$. The $4F_{sc}/5$ clock signal is applied to the frequency divider 569 which divides the signal by two to produce the clock signal $2F_{sc}/5$. Frequency divider 569 applies this clock signal to frequency divider 570 which divides the $2F_{sc}/5$ clock signal by two to produce the $F_{sc}/5$ clock signal. The $F_{sc}/5$ clock signal is applied to the frequency divider 572 which divides the frequency of the $F_{sc}/5$ clock signal by thirty-two. The output signal of frequency divider 572 changes from a logic low state to a logic high state when 640 pulses of the $4F_{sc}$ clock signal have been applied to the frequency divider chain. Each of the 640 pulses corresponds to one sample of the auxiliary signal that is processed by the horizontal signal processor 14 and vertical signal processor 16. The output signal of frequency divider 572 is applied to one input terminal of AND gate 573 the other input terminal of which is connected to the output terminal of frequency divider 568. A logic high signal at the output terminal of frequency divider 572 enables the AND gate 573 to apply the $4F_{sc}/5$ clock signal to the processing delay counter 574. Counter 574 counts a predetermined number of the $4F_{sc}/5$ clock pulses and latches its output signal high. This high signal causes the inverter 576 to apply a low signal to the AND gate 566 disabling it from applying the $4F_{sc}$ clock signal to the frequency divider 568, and consequently disabling the clock signals $4F_{sc}/5$, $2F_{sc}/5$ and $F_{sc}/5$.

As set forth above, each line of the auxiliary image is developed from approximately 80 percent of the samples in the active portion of a line of the auxiliary signal, or 640 of the 910 samples taken at $4F_{sc}$. The frequency dividers 568, 569, 570 and 572 provide a sufficient number of clock pulses to process the 640 samples and the processing delay counter 574 prolongs the clock signals by a sufficient amount of time to allow the last sample of each line to propogate through the horizontal and vertical signal processing circuitry. The amount of delay provided by the counter 574 will depend on the processing speed of the devices used. One skilled in the art of digital design would know how much delay is needed in a particular system.

The counter 562 delays the start of the generated clock signals relative to the horizontal sync pulse to center the 640 samples in the active area of the auxiliary image. A delay of 128 samples is chosen to simplify implementation. It is anticipated, however, that other delays may be used.

The auxiliary field memory 22 accepts samples representing the auxiliary image from data encoder 18 coincident with the pulses of the write clock signal, WCLK, and applies samples to data decoder 34 as requested, coincident with the pulses of the read clock signal, RCLK. The WCLK signal is applied to the memory 22 by the memory input address and clock signal generator 20 via the three state buffer 24. Buffer 24 is controlled by the signal MEM FREE to provide WCLK to the clock signal input terminal of memory 22 when MEM FREE is high and to provide a high impedance when MEM FREE is low.

Similarly, the read clock signal RCLK is applied to the clock input terminal of the memory 22 by the memory output address and clock signal generator 26 via the three state buffer 30. Buffer 30 is controlled by an inverted MEM FREE signal provided by inverter 28. Consequently, buffer 30 applies the RCLK signal to the memory when MEM FREE is low and applies a high impedance when MEM FREE is high.

In general, it is preferred for memory read operations to occur during a carefully controlled portion of the main horizontal line so that the auxiliary image is displayed without jagged edges. Consequently, in the present embodiment, the memory read operations are controlled by a clock that is locked in frequency and phase to the horizontal line synchronization pulses of the main signal. The memory write operations for one line of auxiliary image data are performed during three of the main horizontal line intervals in time intervals when data is not being read from the memory. The memory output address and clock signal generator 26 provides a signal MEM FREE which indicates when data may be written into the memory. When MEM FREE changes from high to low, the memory input address and clock signal generator suspends the generation of the write clock signals WCLK and WCLK/2 and changes the write enable signal WE to allow data to be read from the memory. When the memory read operation is complete, MEM FREE changes from low to high and the write operation resumes at the pixel and address values it was processing when the write operation was interrupted. The write operation continues in this manner until all of the 128 samples representing the control data and auxiliary image pixels for one line are written into the memory.

The auxiliary field memory 22 may be a conventional 8K by eight-bit random access memory. Samples are written into the memory from the data bus when the memory is clocked and the write enable signal, WE, is high. In the present embodiment, the memory write clock has a frequency of $2F_{sc}/3$. In the NTSC system, this write clock frequency allows approximately 420 ns for writing each sample into the memory. The read clock used in the present embodiment operates at a frequency of $12F_{sc}/5$ which allows approximately 115 ns to read each sample from memory. These read and write timing signals are well within the range of commercially available random access memories.

Figure 8:
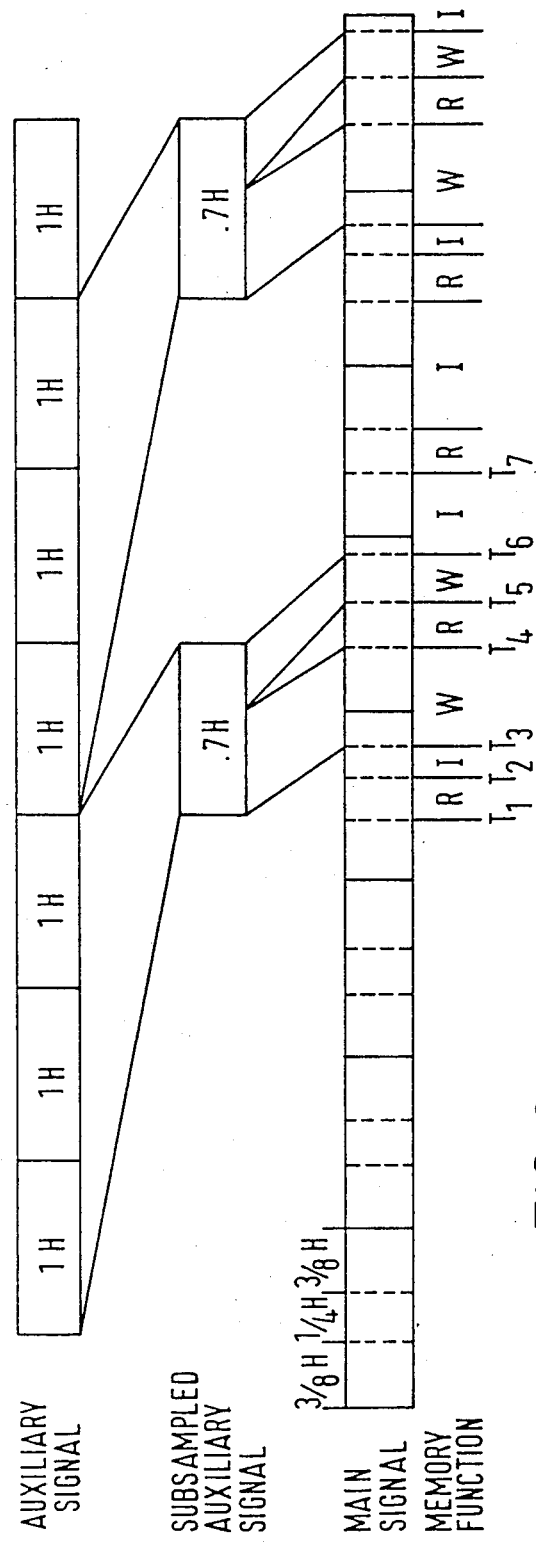
FIG. 8 is a timing diagram that is useful for explaining the operation of the receiver shown in FIG. 1.

At 420 ns per sample, approximately 54 $\mu$s or 0.85H are required to write 128 samples into the memory. At 115 ns per sample, however, only about 14 $\mu$s or about 0.23H are needed to read 128 samples from the memory. FIG. 8 is a timing diagram showing how the lines of auxiliary signal are subsampled and stored into the auxiliary field memory.

Three consecutive lines of one field of the auxiliary signal are filtered and subsampled into 128 samples representing approximately 80 percent of the information in the active portion of a line of the auxiliary video signal. 124 of these samples plus four samples containing control information are written into the memory during the time intervals between memory read operations. In the example shown in FIG. 8, the auxiliary image is centered horizontally within the main image so the memory read operations occur during the middle one-quarter of the main signal horizontal line interval.

Referring to FIG. 8, one of these read operations begins at time $T_1$ and ends at time $T_2$. Since there is no outstanding write operation at time $T_2$, the memory is idle until time $T_3$. At $T_3$, a new line of samples are available to be written into the memory 22. As there are no read operations in progress, the samples are written into the memory between times $T_3$ and $T_4$. At time $t_4$, a read operation occurs and the write operation is suspended. At $T_5$, the read operation ends. The remaining samples are written into the memory between times $T_5$ and $T_6$. The memory is idle from times $T_6$ to $T_7$, when a read operation occurs.

In the present embodiment, approximately 143 $\mu$s or 2.25H is available for writing each line of auxiliary signal into the memory 22. This time is sufficient to ensure that a line of auxiliary signal may be written into the memory during the allowed three horizontal line intervals of the auxiliary signal while data is read from the memory for display synchronously with the main signal, regardless of the relative timings of the main and auxiliary signals.

As set forth above, data is output from memory 22 by the selective application of a read clock (RCLK) and memory read addresses. The data is applied to the data decoder 34.

Data decoder 34 accepts the encoded signal data from memory 22, extracts the control information from the beginning of each stored auxiliary image line and separates the luminance and color difference signals to produce scaled parallel luminance and color difference signals.

Figure 6:
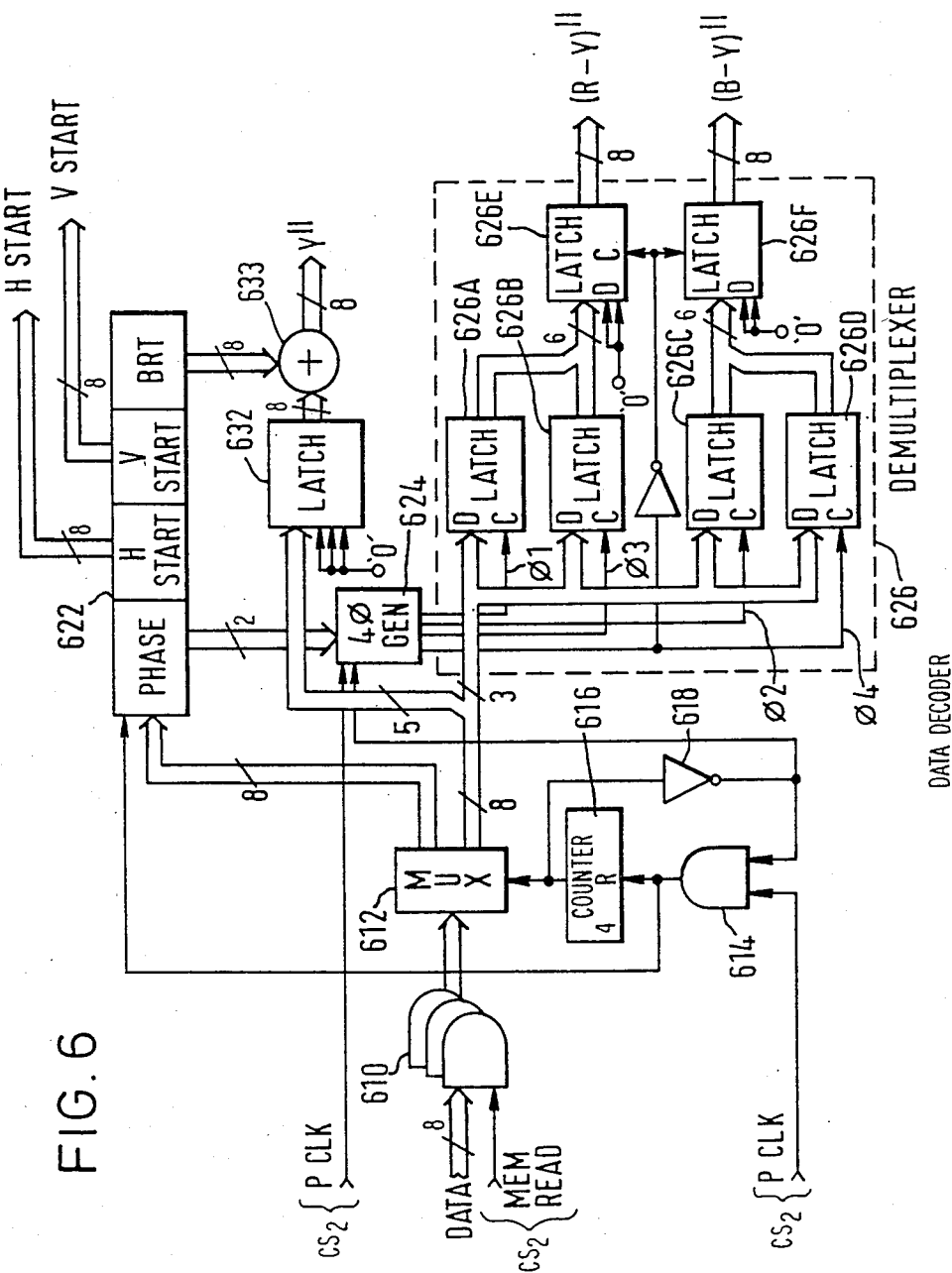
FIG. 6 is a block diagram of a data decoder which may be used in the receiver shown in FIG. 1.

FIG. 6 illustrates exemplary circuitry for the data decoder 34. In FIG. 6 the sample rate clock PCLK and the control signal MEM READ, supplied from the memory output address and clock signal generator 26 and the control data H START, and V START are supplied to data decoder 34 via the bus $CS_2$ (FIG. 1). The sample rate clock PCLK contains pulses only during memory reading intervals.

Data read from memory 22 is applied to AND gates 610 which are selectively enabled by the memory read signal, MEM READ. AND gates 610 are included to reduce loading of the data bus, DATA, and to preclude spurious data from being applied to multiplexer 612 when data is not being read from memory 22. The output of AND gates 610 is applied to the input port of multiplexer 612, which is conditioned by the output from counter 616, to couple the first four data samples from each image line of data to register 622 and to couple the remaining samples from each image line of data to latch 632 and demultiplexer 626. As has been described earlier, the first four samples of each image line contain information to control the memory output address and clock signal generator 26. These four samples are clocked into the four stage serial-in-parallel-out register 622 by four clock pulses supplied by AND gate 614 at the beginning of each line. Each stage of register 622 is a parallel-bit stage to accomodate all of the bits of the respective control samples. The respective control samples are available on busses H START, V START and BRT for the duration of the remainder of the current auxiliary signal image line being read from memory. Control data loaded into register 622 from the last line of each auxiliary signal field is retained until the first line of the next auxiliary signal field is read into the data decoder. The control data from the last line of one field controls the timing of reading the first line of auxiliary signal from the next field.

When the illustrated system initially starts up, the data decoder 34 will not have received the proper H START and V START parameters for display of the first field of the auxiliary image. However, register 622 will contain some values. Even if the values are all zero they will be sufficient to load the control data from at least one line of image data stored in memory to thereafter properly reference the system. Nominally, this set up occurs before the receiver is conditioned to display the auxiliary image.

The control signal applied to multiplexer 612 from counter 616 is developed from the main signal horizontal sync pulses MAIN HSYNC and the sample clock, PCLK. The MAIN HSYNC signal resets counter 616 at the beginning of each horizontal image line. The reset operation causes the counter to output a logic low signal. A logic low applied to multiplexer 612 conditions it to pass input signal to register 622 and a logic high conditions multiplexer 612 to pass input signal to demultiplexer 626.

Output signal from counter 616 is complemented in logic inverter 618 and applied to one input terminal and AND gate 614. The logic low output from counter 616 enables the AND gate 614 to couple the sample rate clock, PCLK, to the clock input terminal of counter 616. The counter 616 remains in the reset state until a memory read cycle begins and pulses occur on the PCLK connection. Counter 616 counts the first four PCLK pulses and then outputs a logic high. The logic high output disables AND gate 614 from applying further PCLK pulses to counter 616, constraining its output to remain in the logic high state until the next occurrence of a MAIN HSYNC signal.

The output of AND gate 614 is also coupled to the clock input terminal of register 622. The first four occurring PCLK pulses are coupled to register 622 to shift data therein concurrently with multiplexer 612 coupling the first four data samples to the input of register 622.

After the first four PCLK pulses, the incoming samples from the data bus of memory 22 are coupled to demultiplexer 626 and asynchronous latch 632. The luminance and chrominance components of each sample are separated by directing the five most significant bits of each sample to latch 632 and the three least significant bits of each sample to demultiplexer 626. Latch 632 is an eight-bit latch and the five-bit luminance samples are coupled to the five most significant bit positions in the latch. Zero values are applied to the three least significant bit positions of eight-bit latch 632. The eight-bit output samples provided from latch 632 correspond to the input luminance component scaled by a factor of eight.

The luminance samples are applied to adder 633. The auxiliary signal brightness data BRT from register 622 is coupled to a second input of adder 633. The output Y" of adder 63 consists of luminance samples occurring at the PCLK rate and modified by the brightness control data. The output signal Y" is coupled to the luminance signal input of the digital-to-analog converter and matrix circuit 36 of FIG. 1.

Recalling that the incoming data to the data decoder is formatted in the four sample sequences $Y_n$&(R-Y)$_{nMSB}$, $Y_{n+1}$&(B-Y)$_{nMSB}$, $Y_{n+2}$&(R-Y)$_{nLSB}$, $Y_{n+3}$&(B-Y)$_{nLSB}$, the data applied to demultiplexer 626 consists of three-bit, four-sample sequences (R-Y)$_{nMSB}$, (B-Y)$_{nMSB}$, (R-Y)$_{nLSB}$, (B-Y)$_{nLSB}$. Demultiplexer 626 combines the first and third samples of each sequence to reconstruct the (R-Y) color difference samples and combines the second and fourth samples of each sequence to reconstruct the (B-Y) color difference samples. In demultiplexer 626 the three-bit sample signal data is coupled to the data input terminals of latches 626A-626D. Four phase clock signals generated by the four phase clock generator 624 are applied to respective clock input terminals of the latches 626A-626D. Each of the four phases have a pulse rate of one-quarter of the PCLK pulse rate. The clock phases are arranged so that the (R-Y)$_{MSB}$, the (R-Y)$_{LSB}$, the (B-Y)$_{MSB}$ and the (B-Y)$_{LSB}$ samples are respectively loaded into latches 626A, 626B, 626C and 626D.

The three MSB (R-Y) samples from latch 626A are combined with the three LSB (R-Y) samples from latch 626B to form six-bit (R-Y) samples. These samples are coupled to the six MSB data input connections of eight-bit latch 626E. The two LSB data input connections of latch 626E are coupled to a zero value. After each four-sample sequence is loaded into latches 626A-626D, latch 626E is clocked to load the combined (R-Y) sample applied to its input. Similarly combined (B-Y) samples from latches 626C and latch 626D are loaded into latch 626F.

As illustrated in the figure, clock phase $\phi 4$ loads the last sample, (B-Y)$_{LSB}$, of each four sample sequence into latch 626D. At this point the four samples of a particular sequence are resident in their respective latches 626A-626D. When the clock phase $\phi 4$ goes low it clocks the data from latches 626A and 626B into latch 626E and concurrently clocks the data from latches 626C and 626D into latch 626F.

The output signals from latches 626E and 626F are respective eight-bit samples occurring at a rate of one-quarter of the PCLK rate. These signals correspond to the (R-Y) and (B-Y) color difference signals each scaled by a factor of four by virtue of placing the six-bit combined samples in the six MSB locations of the eight-bit latches 626E and 626F.

The four phase clock generator 624 is presettable and of conventional design. The preset value is provided by the PHASE control data from register 622. This phase data is loaded into the clock generator 624 responsive to the output signal of inverter 618 being in a logic high state. Thus, at the end of the four clock period in which the control data is loaded into shift register 622, clock generator 624 is preset to the phase value for the line. Clock generator 624 is clocked by pulses of the read clock PCLK and produces clock phase pulses substantially concurrently with occurrences of pulses of the PCLK. The clock generator 624 is required to be preset because the first color difference sample on each line of data may be either a (R-Y)$_{MSB}$ sample or a (B-Y)$_{MSB}$ sample. The phase control data is encoded to indicate which sample the first sample happens to be. This phase control data presets the clock generator to align the $\phi 1$, $\phi 2$, $\phi 3$ and $\phi 4$, clock phases with the (R-Y)$_{MSB}$, (B-Y)$_{MSB}$, (R-Y)$_{LSB}$ and (B-Y)$_{LSB}$ samples respectively for the current image line.

The luminance samples Y''' from adder 633 and the (R-Y)" and (B-Y)" color difference samples from latches 626E and 626F respectively are coupled to respective input ports of the digital-to-analog converter and matrixing circuitry 36. In circuitry 36 the respective digital samples are converted to analog, luminance and color difference signals. These analog signals are combined in the appropriate proportions to develop red, R, green, G, and blue, B, color signals for driving the display device (not shown).

The RGB signals are coupled to one set of respective input terminals of multiplexer 38. RGB signals from the main video signal source 40 are coupled to a second set of respective input terminals of multiplexer 38. Multiplexer 38, controlled by the signal provided on connection MUX CONTROL from the memory output address and clock signal generator 26, selectively substitutes the auxiliary RGB signals for the main RGB signals produced at its output terminals.

Figure 7:
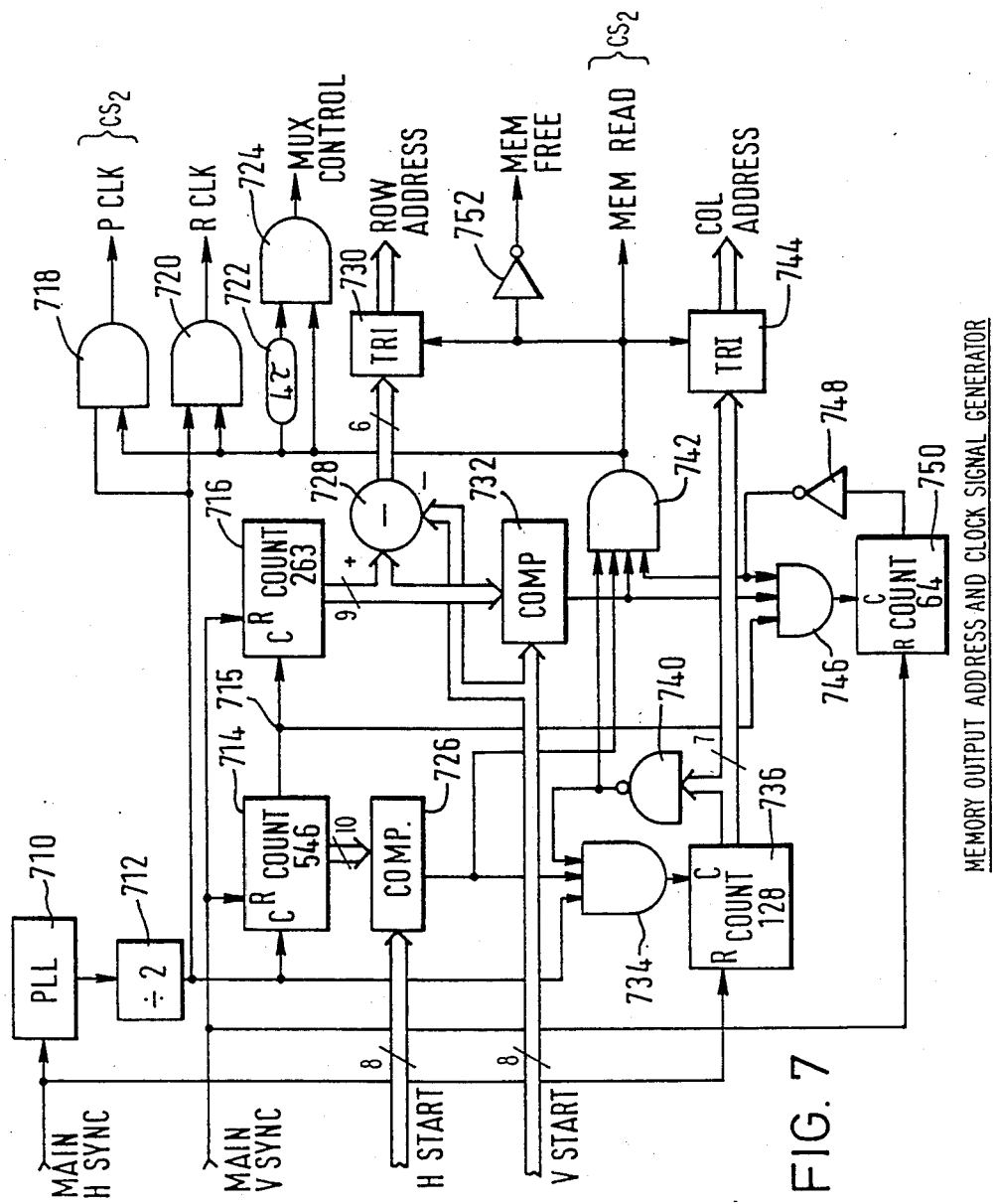
FIG. 7 is a block diagram of a memory output address and clock signal generator suitable for use in the receiver shown in FIG. 1.

FIG. 7 illustrates exemplary circuitry for generating a read clock and read address codes to output data from memory 22. In addition it generates a picture insertion control for multiplexer 38, and the PCLK for the data encoder.

In FIG. 7, a phase locked loop (PLL) 710 generates a clock frequency synchronous to the horizontal sync of the main video signal. In the present embodiment the clock frequency is 1092 times the main signal horizontal frequency. This frequency is divided by two in divider 712 to produce a frequency of 546 times the main signal horizontal sync frequency. The frequency 546H is the rate at which the samples are read from memory and displayed on the reproduced image. Scanning the stored auxiliary signal samples per line at this rate produces an auxiliary image which is compressed to one-third the size of that portion of the original image sampled by the horizontal processor 14. Thus, the auxiliary image is compressed equally in both the vertical and horizontal dimensions.

The 546H clock from divider 712 is applied to AND gates 718 and 720. AND gate 718 and 720 are enabled by the memory read enable signal, MEM READ, from AND gate 742. AND gate 720 provides a read clock, RCLK to memory 22 to sequence the memory through the applied read addresses. The pulse rate of the read clock is always 546H. AND gate 718 provides the sample rate clock, PCLK, to data decoder 34. The PCLK circuit is made separate from the RCLK circuit in anticipation that in particular embellishments of the system it may be desirable to have a PCLK signal which is twice the rate of the RCLK. In this instance AND gate 718 will be coupled directly to the output of the PLL 710 rather than the output of the divide by two circuit 712.

The 546H clock signal is coupled to a horizontal position detector consisting of counter 714 and comparator 726. Counter 714 is reset by the main signal vertical sync signal MAIN VSYNC at the beginning of each field of the main signal and then begins counting the 546H clock pulses. Counter 714 applies a binary output to one input of comparator 726. The binary output corresponds to the cumulative count of the 546H pulses applied to the input of counter 714 since the last reset pulse. Each successive pulse of the 546H clock signal corresponds to a successive horizontal pixel position on the current main picture image line. The horizontal pixel position, H START, at which the left edge of the auxiliary picture is to begin is applied to a second input of comparator 726. When the cumulative count in counter 714 reaches the value H START, comparator 726 produces a logic high output. The output of comparator 726 remains high until counter 714 is reset on the next line.

The output of comparator 726 is applied to one input of AND gate 734. The 546H clock signal is applied to a second input of AND gate 734 and the output of NAND gate 740 is applied to a third input of AND gate 734. The input terminals of NAND gate 740 are connected to respective output bit lines of binary counter 736. The possible binary output values provided from binary counter 736 range from zero to 127 (decimal). The output of NAND gate 740 is a logic high for all output values of the binary counter 736 except value 127 (decimal) which causes the NAND gate 740 to produce a logic low output.

AND gate 734 is enabled to couple the 546H signal to the clock input of binary counter 736 whenever the output value of the counter 736 is less than 127 and the horizontal starting position is indicated to have occurred by a logic high from comparator 726.

Binary counter 736 is reset to zero at the beginning of each image line by the signal MAIN HSYNC. When the output of comparator 726 goes high binary counter 736 begins counting and produces sequential output values from zero to 127. When it reaches the value of 127 it is precluded from changing to another state by the output of NAND gate 740 going low.

The binary output values from binary counter 736 are coupled to a three state gate 744. The output of the three state gate 744 is coupled to the address input port of memory 22. When the three state gate 744 is enabled by AND gate 742, the output values from binary counter 736 correspond to column address words for reading data from the memory.

Counter 714 produces a second output signal on connection 715. This output signal is a pulse of less than a 546H clock period and occurs when counter 714 counts 546 pulses. A count of 546 pulses corresponds to one horizontal line in the main display. Internally, counter 714 is reset to zero when a pulse is produced on connection 715.

The second output from counter 714 is applied to the clock input terminal of binary counter 716. Counter 716 is arranged to count from a zero value to 262 (decimal) and then stop until reset by the next MAIN VSYNC pulse. Counter 716 thus produces a binary output corresponding to the current cumulative number of horizontal image lines occurring since the last MAIN VSYNC pulse, i.e. the current horizontal line number (minus one). The binary output from counter 716 is coupled to one input port of subtracter 728 and one input port of comparator 732. The value V START, from data decoder 34, and corresponding to the upper horizontal image line on which display of the auxiliary image is to start is applied to a second input port of comparator 732 and the subtrahend input port of subtracter 728.

Comparator 732 produces a logic high output when the cumulative value from counter 716 equals the value V START. The output of comparator 732 remains high until binary counter 716 is reset by the next MAIN VSYNC pulse.

The output values provided by subtracter 728 are coupled to the three state gate 730, the output of which is coupled to the row address connection of the address input port of memory 22. The values from subtracter 728 equal the current line number minus the value V START. During periods when the memory is enabled to read data, i.e. periods when the three state gate 730 is enabled, the values provided sequence from zero to 63.

The auxiliary signal data is contained in memory locations addressed by 64 row address codewords, and is displayed in 64 consecutive image lines of the main picture. It is therefore necessary to count 64 lines from, and including, the vertical starting line, to generate a signal that may be used to enable the three state gates 730 and 744 only during the 64 horizontal lines immediately after the occurrence of the vertical starting position. Counter 750, AND gate 746 and inverter 748 are arranged to count 64 line periods. counter 750 counts the horizontal pulses from the output connection 715 of counter 714 provided via AND gate 746. AND gate 746 has respective input terminals connected to the output of comparator 732 and the output of inverter 748. The input of inverter 748 is connected to the output of counter 750. Counter 750 is reset by the vertical pulses from MAIN VSYNC conditioning its output to a logic low. Consequently, the output of inverter 748 is high. Under these conditions, AND gate 746 will be enabled to pass horizontal line pulses to counter 750 after comparator 732 detects the starting horizontal line. After 64 line pulses are coupled to counter 750 it generates a logic high output signal. This forces the output of inverter 748 low disabling AND gate 746. The output of inverter 748 is therefore high from the beginning of a respective field period and goes low after the last line of the auxiliary image.

The control signals to enable the three state gates 730, 744 and AND gates 718 and 720 is high only during the intervals when the auxiliary image signal is actually being displayed, in order that the memory 22 may be free for the maximum amount of time to write new data. Thus, the output of AND gate 742 is high during the read positions of those horizontal lines after comparator 732 goes high i.e. from the vertical starting line, and until 64 lines are read from memory, i.e. when counter 750 produces an output pulse. Accordingly, the output signals from comparator 726, NAND gate 740, comparator 732 and inverter 748 are coupled to respective input terminals of AND gate 742.

The output signal generated by AND gate 742 defines the memory read intervals. The complement of this signal therefore defines the intervals that the memory is free to write new data. Inverter 752 coupled to the output of AND gate 742 produces the signal MEM FREE which is the complement of the MEM READ signal.

It is contemplated, however, that data may be read from the memory during a portion of each horizontal line of the main image. In this alternative embodiment, the data read from memory would be processed and displayed only when the auxiliary image is displayed. The memory read operations would periodically refresh the stored data, allowing memory 22 to use inexpensive dynamic RAM's.

The multiplexer 38 substitutes the auxiliary video (RGB) signals for the main video (RGB) signals during the intervals that the auxiliary signals are read from memory. These intervals correspond to the logic high periods of the signal MEM READ. However, it will be recalled that the first four samples per line read from memory contain control information. To account for the time occupied by these four samples each logic high interval of the MEM READ signal is foreshortened by four sample periods to generate the control signal, MUX CONTROL, for multiplexer 38. This is accomplished by coupling the signal MEM READ to one input terminal of AND gate 724. The MEM READ signal is delayed by four sample periods and applied to a second input terminal of AND gate 724 which generates the signal MUX CONTROL.

What is claimed is:

1. In a pix-in-pix television display including a source of main video signal and a source of sampled data auxiliary video signal having a predetermined sample rate, apparatus for displaying an image developed from the auxiliary signal as an inset in the image developed from the main signal, comprising:

means, responsive to said auxiliary sampled data signal, for developing a compressed auxiliary sampled data signal by subsampling said auxiliary sampled data signal in a ratio of one to N, N being a real number greater than two;

means for displaying said main signal; and means for displaying said compressed auxiliary sampled data signal, as an inset in the display of said main signal, at a sample rate substantially equal to M/N times said predetermined sample rate to produce an apparent size reduction of 1/M in said auxiliary image, M being an integer greater than 1 and less than N.

2. In a pix-in-pix television display including a source of main video signal and a source of sampled data auxiliary video signal having a predetermined sample rate, each of said signals being composed of successive horizontal line portions, apparatus for displaying an image developed from the auxiliary signal as an inset in the image developed from the main signal, comprising:

means responsive to said auxiliary sampled data signal for developing a compressed auxiliary sampled data signal by subsampling said auxiliary sampled data signal in a ratio of one to N, N being an integer greater than two;

auxiliary image vertical signal processing means including means for subsampling the horizontal line portions of said compressed auxiliary sampled data signal to reduce the number of horizontal lines in said auxiliary image by a ratio of one to M, M being a positive integer greater than one and less than N;

means for displaying said main signal; and auxiliary image displaying means coupled to said auxiliary image vertical signal processing means for displaying each of the horizontal line portions of the signals provided thereby as an inset in a respectively different horizontal line portion of said main signal at a rate substantially equal to M/N times said predetermined sample rate to produce an apparent size reduction of 1/M in both the vertical and horizontal dimensions of said auxiliary image.

3. The apparatus set forth in claim 2 wherein said auxiliary image vertical signal processing means further includes vertical signal filtering means comprising:

memory means, having a sufficient number of bits for holding the samples which represent one horizontal line portion of said compressed auxiliary sampled data signal;

means coupled to said memory means for subtracting samples provided by said memory means from samples of said compressed auxiliary signal, to develop difference samples;

sample scaling means coupled to said subtracting means for multiplying the difference samples provided by said subtracting means by a scale factor to develop scaled difference samples; and means coupled to said memory means and to said sample scaling means for adding said scaled difference samples to samples from said memory means and for storing the summed samples in said memory means.

4. The apparatus set forth in claim 3 wherein:

said means for developing a compressed auxiliary sampled data signal includes means for subsampling said auxiliary sampled data signal in a ratio of one to five;

said vertical signal filtering means provides one horizontal line portion of said compressed auxiliary sampled data signal for every three horizontal line portions of said compressed auxiliary sampled data signal provided to said vertical signal filtering means;

said sample scaling means scales the difference samples developed by subtracting, in said subtracting means, the samples provided by said memory from a first line of samples by a scale factor of one and scales the difference samples developed by subtracting the samples provided by said memory from second and third line of samples by respective scale factors of one-half and three-eighths; and said auxiliary image displaying means includes means for displaying the signals provided by said auxiliary image vertical signal processing means at a rate substantially equal to three-fifths times said predetermined sample rate.

5. The apparatus set forth in claim 2 wherein:

said auxiliary video signal includes a chrominance reference signal component having a predetermined frequency and said main video signal includes a horizontal line synchronizing signal component;

said predetermined sample rate is substantially equal to K times the frequency of said chrominance reference signal component, where K is an integer greater than 1; and said auxiliary image displaying means includes:

means responsive to the horizontal line synchronizing signal component of said main video signal for developing a clock signal having a frequency substantially equal to M/N times said predetermined sample frequency and locked in phase with the horizontal line synchronizing signal component of said main video signal; and means for displaying said compressed auxiliary sampled data signal synchronously with said clock signal.

6. In a pix-in-pix television display including a source of main video signal, a source of sampled data auxiliary luminance signal having a predetermined sample rate and a source of sampled data auxiliary chrominance signal having said predetermined sample rate, each of said signals being composed of successive horizontal line portions, wherein said auxiliary luminance signal has a predetermined bandwidth and said auxiliary chrominance signal has a bandwidth approximately equal to 1/L times said predetermined bandwidth, L being an integer greater than 1, apparatus for displaying an image developed from the auxiliary signal as an inset in the image developed from the main signal comprising:

auxiliary image horizontal signal processing means including means, coupled to said source of sampled data auxiliary luminance signal and to said source of sampled data auxiliary chrominance signal, for developing compressed auxiliary sampled data luminance and chrominance signals by subsampling said sampled data luminance signal in a ratio of one to N and by subsampling said auxiliary sampled data chrominance signal in a ratio of one to the quantity L times N, N being an integer greater than two;

auxiliary image vertical signal processing means including means for subsampling the horizontal line portions of said compressed auxiliary sampled data luminance and chrominance signals to reduce the number of lines in said auxiliary image by a ratio of one to M, M being a positive integer less than N;

means for displaying said main signal;

means coupled to said auxiliary image signal processing means for combining respective samples of said compressed auxiliary luminance and chrominance signals in an L to one ratio; and means for displaying each of the horizontal line portions of said combined sampled data signals as an inset in a respectively different horizontal line portion of said main signal at a rate substantially equal to M/N times said predetermined sample rate to produce an apparent size reduction of 1/M in both the vertical and horizontal dimensions of said auxiliary image.

7. The apparatus set forth in claim 6 wherein said auxiliary image vertical signal processing means further includes vertical signal filtering means comprising:

memory means, having a sufficient number of bits for holding the samples which represent one horizontal line portion of said compressed auxiliary sampled data signal;

means coupled to said memory means for subtracting samples provided by said memory means from samples of said compressed auxiliary signal, to develop difference samples;

sample scaling means coupled to said subtracting means for multiplying the difference samples provided by said subtracting means by a scale factor to develop scaled difference samples; and means coupled to said memory means and to said sample scaling means for adding said scaled difference samples to samples from said memory means and for storing the summed samples in said memory means.

8. The apparatus set forth in claim 7 wherein:

the sampled data auxiliary chrominance signal has a bandwidth that is approximately one-fourth times the bandwidth of said sampled data auxiliary luminance signal and includes first and second color difference signal components;

said auxiliary image horizontal signal processing means further includes means for developing first and second sampled data color difference signals representing respectively said first and second color difference signal components and each having a sample rate substantially equal to one-half times said predetermined rate;

said means for developing compressed sampled data luminance and chrominance signals includes means for subsampling said sampled data luminance signal in a ratio of one to five and means for subsampling each of said first and second sampled data color difference signals in a ratio of one to ten;

said vertical signal filtering means provides one horizontal line portion of each of said compressed auxiliary sampled data luminance and first and second color difference signals respectively for every three horizontal line portions of the respective signals provided by said auxiliary image horizontal signal processing means;

said combining means includes means for combining respective samples of said compressed auxiliary luminance signal and each of said compressed auxiliary first and second color difference signals in a four-to-one ratio to produce red, green and blue sampled data primary color signals; and said displaying means includes means for displaying said red, green and blue sampled data primary color signals at a rate three-fifths times said predetermined sample rate.

9. The apparatus set forth in claim 8 wherein:

said auxiliary video signal includes a chrominance reference signal component having a predetermined frequency and said main video signal includes a horizontal line synchronizing signal component;

said predetermined sample rate is substantially equal to four times the frequency of said chrominance reference signal component; and said displaying means includes:

means responsive to the horizontal line synchronizing signal component of said main video signal for developing a clock signal having a frequency substantially equal to three-fifths times said predetermined sample frequency and locked in phase with the horizontal line synchronizing signal component of said main video signal; and means for displaying said red, green and blue sampled data primary color signals synchronously with said clock signal.

* * * * *